May 7, 1957 W. E. TWAMLEY 2,791,135
STEP DRILLING TURRET INDEXING AND FEEDING MECHANISM
Filed Dec. 14, 1953 8 Sheets-Sheet 1

Inventor:
William E. Twamley,
by Maxwell Fish
Attorney

May 7, 1957 W. E. TWAMLEY 2,791,135
STEP DRILLING TURRET INDEXING AND FEEDING MECHANISM
Filed Dec. 14, 1953 8 Sheets-Sheet 2

Inventor:
William E. Twamley,
by Maxwell Fish
Attorney

May 7, 1957 W. E. TWAMLEY 2,791,135
STEP DRILLING TURRET INDEXING AND FEEDING MECHANISM
Filed Dec. 14, 1953 8 Sheets-Sheet 3

Inventor:
William E. Twamley,
by Maxwell Fish
Attorney

United States Patent Office 2,791,135
Patented May 7, 1957

2,791,135

STEP DRILLING TURRET INDEXING AND FEEDING MECHANISM

William E. Twamley, Providence, R. I., assignor to Brown & Sharpe Mfg. Co., Providence, R. I., a corporation of Rhode Island Application December 14, 1953, Serial No. 397,884

10 Claims. (Cl. 77—32.3)

The present invention relates to improvements in screw machines and more particularly to a screw machine turret indexing and feeding mechanism.

The invention is herein disclosed as embodied in an automatic screw machine provided with a rotary work spindle through which successive increments of rotating bar stock are presented to the tools, and a tool supporting assembly including a tool supporting turret and a turret slide movable parallel to the rotational axis of the work. The turret operating mechanism in general comprises a lead cam which rotates once for each full cycle of operations on a work piece to feed the tools supported on the turret successively against the work, a Geneva motion mechanism for indexing the turret, and means timed with the Geneva motion mechanism for imparting retracting or pull-out and return movements to the turret slide. It is proposed also that the pull-out mechanism may be used independently of the Geneva motion mechanism to pull out and return the feed slide to its operative position between successive passes with the same tool against the work.

Principal objects of the invention are to provide a novel construction and arrangement of the turret operating mechanism of the machine including particularly the mechanisms for indexing the turret, and for imparting feeding and pull-out and return movements to the turret slide which is simple, efficient, readily accessible for adjustment and the replacement of cams, and organized to reduce to a minimum the number and weight of the moving parts required to be carried on the turret slide.

With these and other objects in view as may hereinafter appear, a feature of the invention consists in the provision of a novel construction and arrangement of the driving connections from the lead cam including a variable linkage connection supported from the base portion of the machine and arranged to be moved about one center for imparting feeding movements to the turret slide and to be moved about another center for effecting the pull-out and return movements of the turret slide.

Another feature of the invention consists in a novel construction and arrangement of the driving mechanism for imparting indexing movements to the turret and pull-out and return movements to the turret slide. In the embodiment of the invention, shown, driving connections are provided from the one revolution clutch for driving a Geneva motion pin which forms part of the Geneva motion mechanism mounted on a fixed portion of the machine. A second driving train from the one revolution clutch is employed for imparting the pull-out and return movements to the turret slide.

Further in accordance with the invention the mechanism for imparting pull-out and return movements to the turret slide takes the form of an eccentric which acts on a secondary rocker lever which is thus caused to turn about its connection with the lead cam follower lever and thus to affect a control variation of the linkage connections between the lead cam and the turret slide.

Another feature of the invention consists more specifically in the construction and arrangement of the indexing mechanism, of which the Geneva motion pin is supported on a fixed portion of the machine being connected by means of a drive shaft and a drive gear supported thereon with a long spline gear on the turret slide.

Another feature of the invention consists in the provision of a skip cam on the lead cam shaft which acts when rendered operative to disengage the Geneva pin from engagement with the Geneva motion wheel and thus to prevent indexing of the turret for certain operations in which the same tool is required to make successive passes in order to produce the desired depth of cut.

Further in accordance with the invention, the locking pin for the turret is controlled by means of a long rearwardly extending lever arm arranged to be engaged by an elongated actuating member operated by a cam on the fixedly mounted Geneva star wheel.

Another feature of the invention consists in the provision of a locking device which acts positively to prevent the tripping of the one revolution indexing clutch while the Geneva skip mechanism of the illustrated machine is in operation.

The several features of the invention consist also in the devices, combinations, and arrangement of the parts hereinafter described and claimed, which together with advantages to be obtained thereby will be readily understood by one skilled in the art from the following description taken in connection with the accompanying drawings, in which:

Fig. 7 is a detail plan view, partly in section to illustrate particularly the Geneva motion mechanism, the pull-out cam for moving the slide rocker pivot, and the driving connections from the single revolution clutch to each of the pull out cams and the Geneva mechanism;

Figure 1:
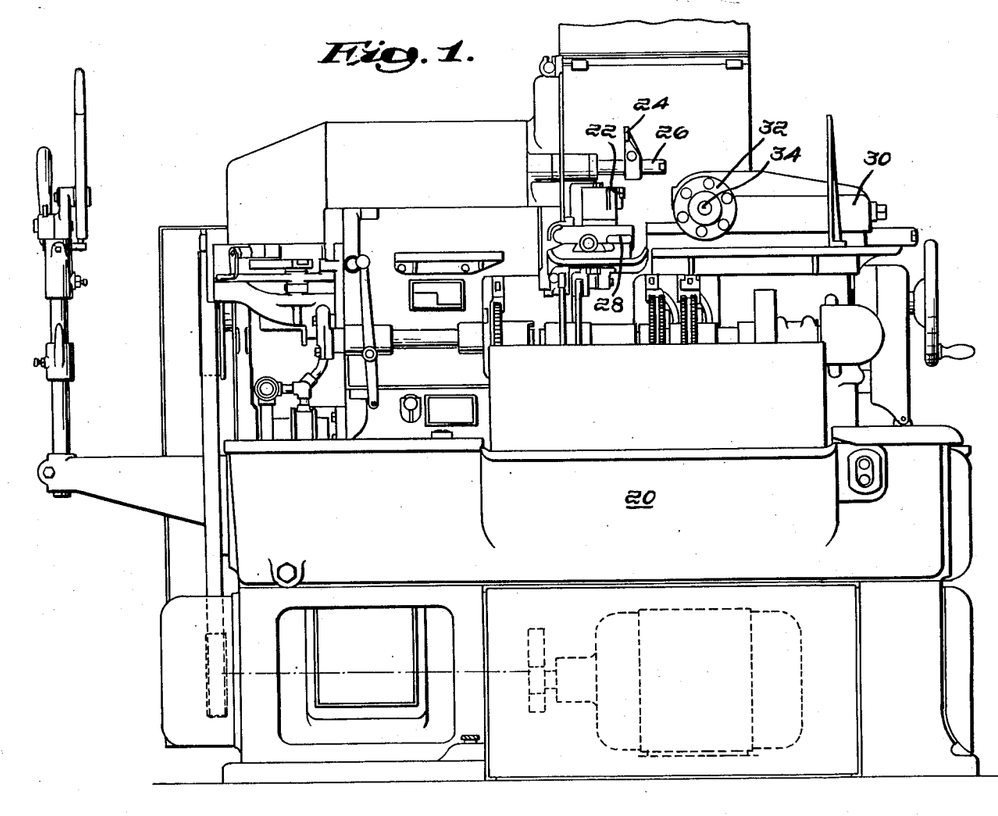
Fig. 1 is a view in front elevation of an automatic screw machine embodying in a preferred form the several features of the invention.

The invention is herein disclosed as embodied in an automatic screw machine of a conventional type as shown for example in the patent to Davenport 604,306, dated May 17, 1898, and which comprises a base 20 on which is mounted a rotary work spindle 22 through which bar stock is fed and which is provided at its right hand end as shown in Fig. 1 with a feed collet of ordinary description adapted to engage with and to feed the bar stock against a stock stop 24 illustrated in Fig. 1 in a raised inoperative position on its supporting bar 26. Operating tools for performing successive operations upon a workpiece are mounted upon and are moved into and out of operating relation with the workpiece on a number of tool slides, of which there are shown in Fig. 1 a cross slide 28, a longitudinally movable turret slide 30, and a rotatable work supporting turret 32 which is mounted to turn on a transverse pivot 34 on the turret slide 30.

The machine is provided with driving and control mechanism for moving the several tool slides and for indexing the turret 32 in accordance with an operating cycle which for certain types of work may include the performance of a substantial number of successive operations.

Figure 6:
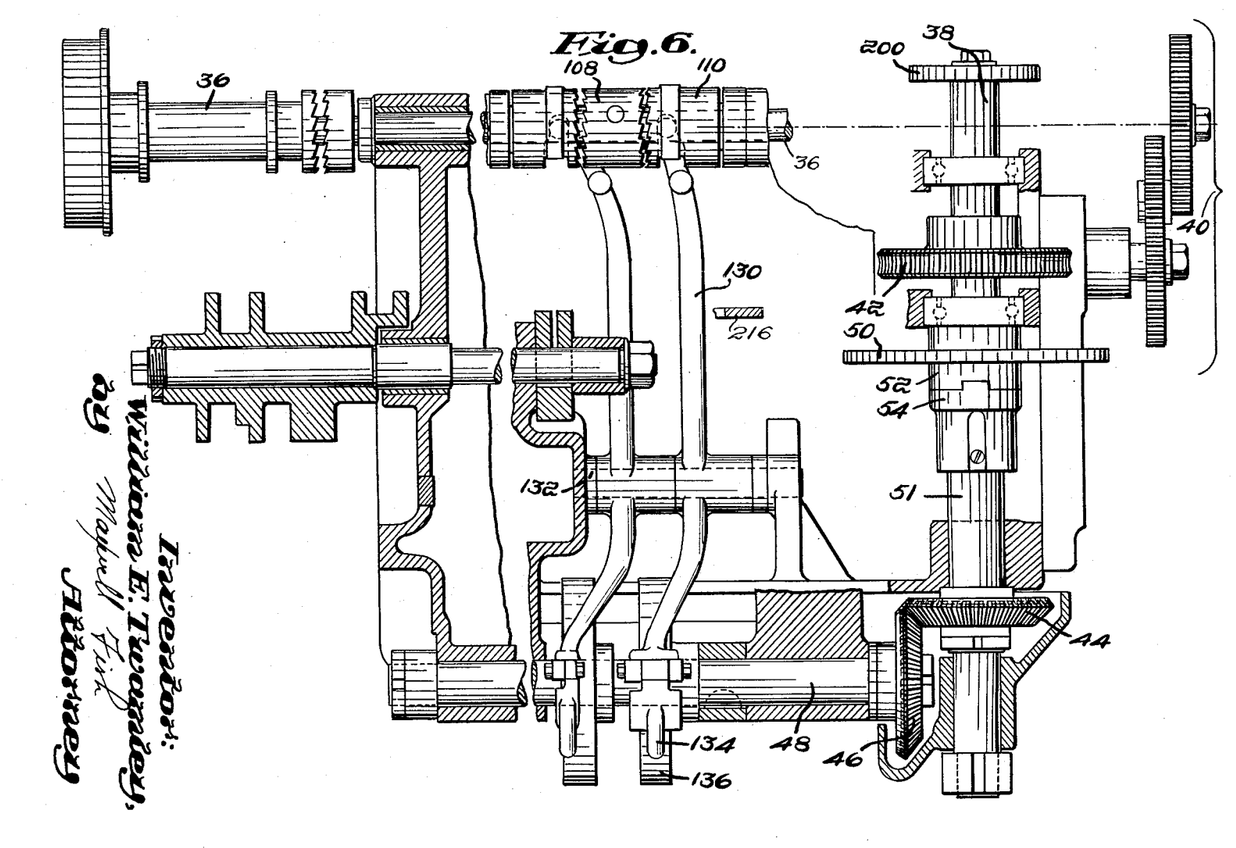
Fig. 6 is a plan view partly in section with portions broken away to illustrate the driving connections for the turret indexing mechanism.

The driving mechanism referred to, as best shown in Fig. 6, includes a rear drive shaft 36, a cross cam shaft 38 which is driven from the shaft 36 through a series of change speed gears generally indicated at 40, and a worm and worm wheel 42 which carries cams for controlling the operation of the longitudinally movable turret. The cam 38 is connected by bevel gears 44, 46 with a drive cam shaft 48 mounted at the front side of the machine in parallel relation with the drive shaft 36.

In accordance with the present invention the illustrated machine is provided with an improved mechanism for imparting indexing movements to the turret and for imparting, retracting and return, and feeding movements to the turret slide which is of simple construction and will operate with a greater degree of smoothness and precision and with less wear on the parts than such mechanisms of the prior art.

The mechanism for imparting retracting and return, and feeding movements to the turret slide as best shown in Figs. 2, 4, 5 and 6 comprises a lead cam 50 mounted upon and secured to turn with the cross cam shaft 38. An extension 51 of shaft 38 is adapted to be connected thereto by means of a one-toothed clutch consisting of a driving sleeve clutch member 52 supported on the shaft 38, and a mating clutch element 54 keyed to turn with the shaft extension 51. The lead cam is connected through linkage connections hereinafter more specifically set forth to operate a rocker arm 56 pivotally supported intermediate its length to turn about a movably supported pivot pin 57 and its supporting roller 58 which rides in a horizontal slot 59 in a bracket or plate 60 fixedly mounted on the machine. At its upper end the rocker arm 56 is provided with a gear toothed segment 61 for engagement with a rack 62 formed in the under side of the turret slide 30. At its lower end the rocker arm 56 is connected by a link 63 with a downwardly extending arm 64 of a cam follower lever 66 supported on a fixed pivot 68 and provided with a cam follower roll 70.

In the illustrated machine a retracting and return movement is imparted to the turret slide by means of a separate driving connection from the rear control shaft of the machine which operates to change the linkages existing between the cam follower lever 64, 66, and the rocker arm 56, so that it becomes unnecessary at any time for the cam follower lever roll 70 to move out of engagement with its cam 50, and further so that the deep cut-outs in the lead cam itself are eliminated with consequent simplification of the cam contour. The mechanism for shifting the linkage connection to impart a retracting and return movement to the turret slide consists of a double pull out cam 74 which is supported on a cross shaft 76 and is adapted for engagement with a pair of rollers 80 on the pivot pin 57 at each side of the roller 58 and its slotted supporting bracket 60.

Figures 2, 3:
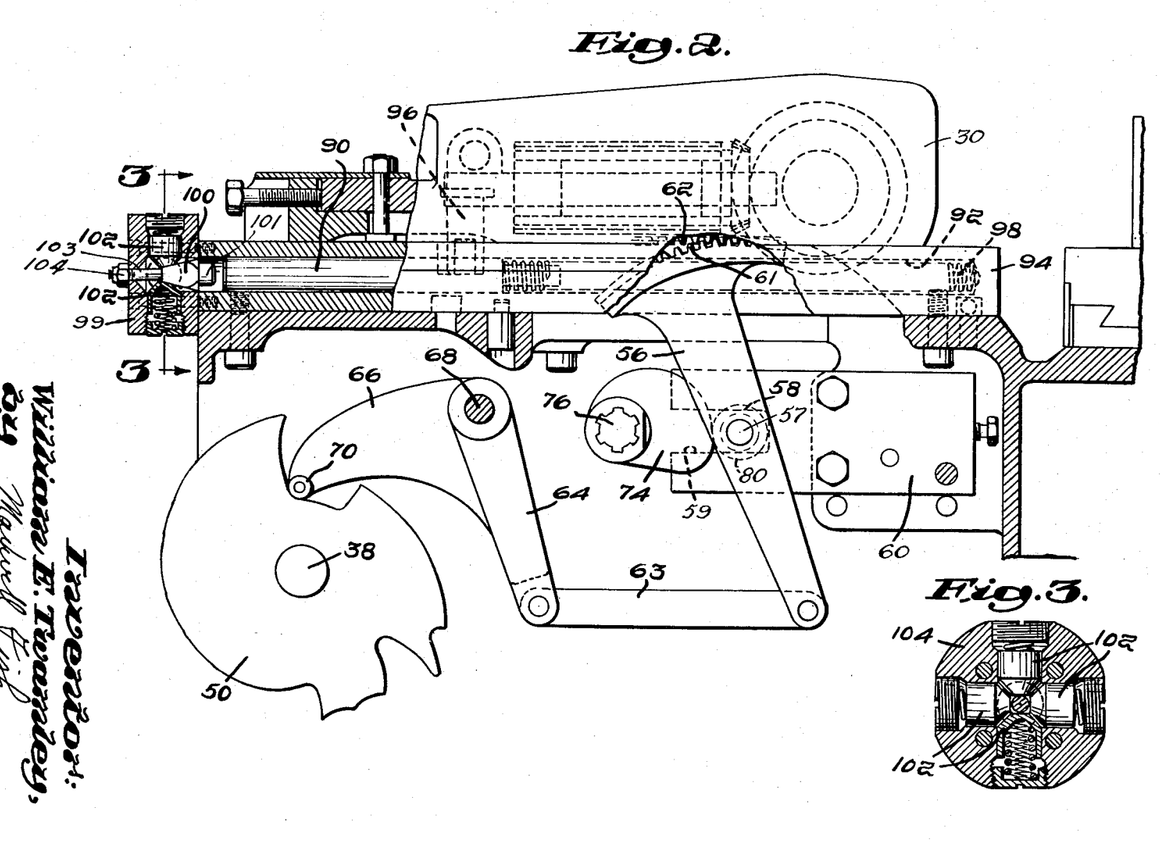
Fig. 2 is a fragmentary detail view on an enlarged scale, looking from the rear of the machine, of the mechanism for advancing and retracting the turret slide.
Fig. 3 is a detail sectional view taken on the line 3—3 of Fig. 2 illustrating particularly the shock absorber mechanism for cushioning the movement of the slide.
Figure 4:
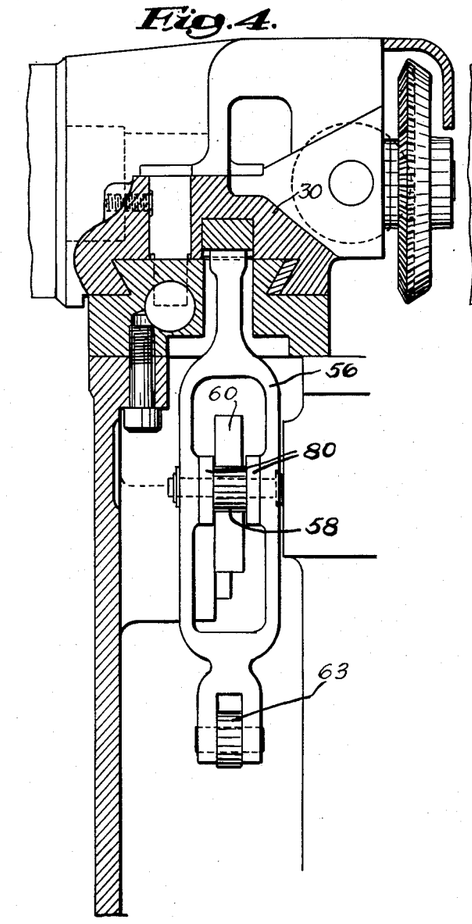
Fig. 4 is a vertical section looking from the left of Fig. 2 illustrating particularly the rocker arm for advancing and retracting the turret slide, together with the shiftable pivot for the rocker arm.
Figure 5:
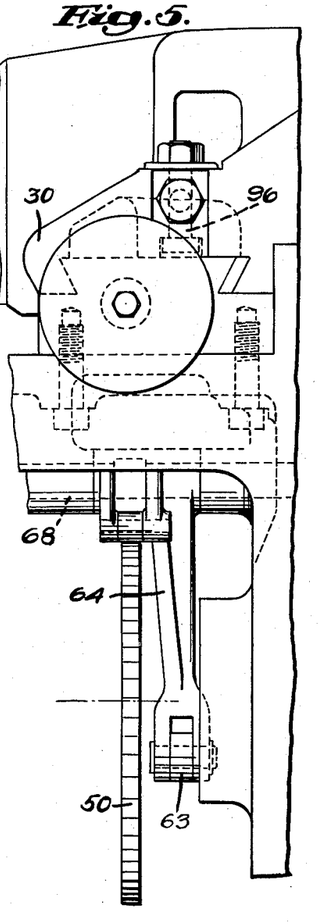
Fig. 5 is a vertical section taken of the left end of Fig. 2 to illustrate particularly the lead cam follower lever and the link by which it is connected with the slide actuating rocker arm.

The turret slide 30 as best shown in Fig. 2 is biased rearwardly away from the work spindle by means of a spring pressed plunger 90 supported within a long cylindrical bore 92 formed in the supporting bed 94 for the turret slide 30. The plunger is connected to move with the turret slide by means of a vertically disposed connecting pin 96 supported at its upper end on the turret slide and at its lower end seated in a milled slot in the plunger. A coil spring 98 seated against the right hand end of the bore as shown in Fig. 2 and arranged to engage against the plunger 90 acts to bias the plunger and turret slide 30 to the left away from the work spindle. The rearward biasing action of the spring 98 tends to maintain the pivotal support for the rocker arm 56 including the rollers 80 in engagement with the pull out cams 74, and through connecting link 62 to maintain the cam follower roller 70 in engagement with the cooperating surface of the lead cam 50.

With the illustrated construction a mechanically operable shock absorber device comprising a housing 99 secured over the outer end of the cylindrical bore 92 is provided to check the movement of the turret slide at its extreme rear position. Referring specifically to Figs. 2 and 3 the spring plunger 90 is arranged at the limit of its movement in a rearward direction to the left as shown in Fig. 2 to engage against a cushion stop member 101 which is slidably supported within the housing 99 and is provided at its outer end with a square taper 100, each surface of which is adapted to be engaged by the tapered tip of one of four spring plungers 102 mounted in the shock absorber unit block 99. At its outer or left hand end the cushion stop member 101 is formed with a stem 103 which extends through the end of the shock absorber unit casing and has threaded thereto a stop nut 104, which limits the forward movement of the cushion member under the influence of the spring plungers 102. This construction has specific advantage that the shock absorbing device operates only when the turret slide 30 and plunger 90 have moved substantially to a fully retracted position.

Figures 6, 7A:
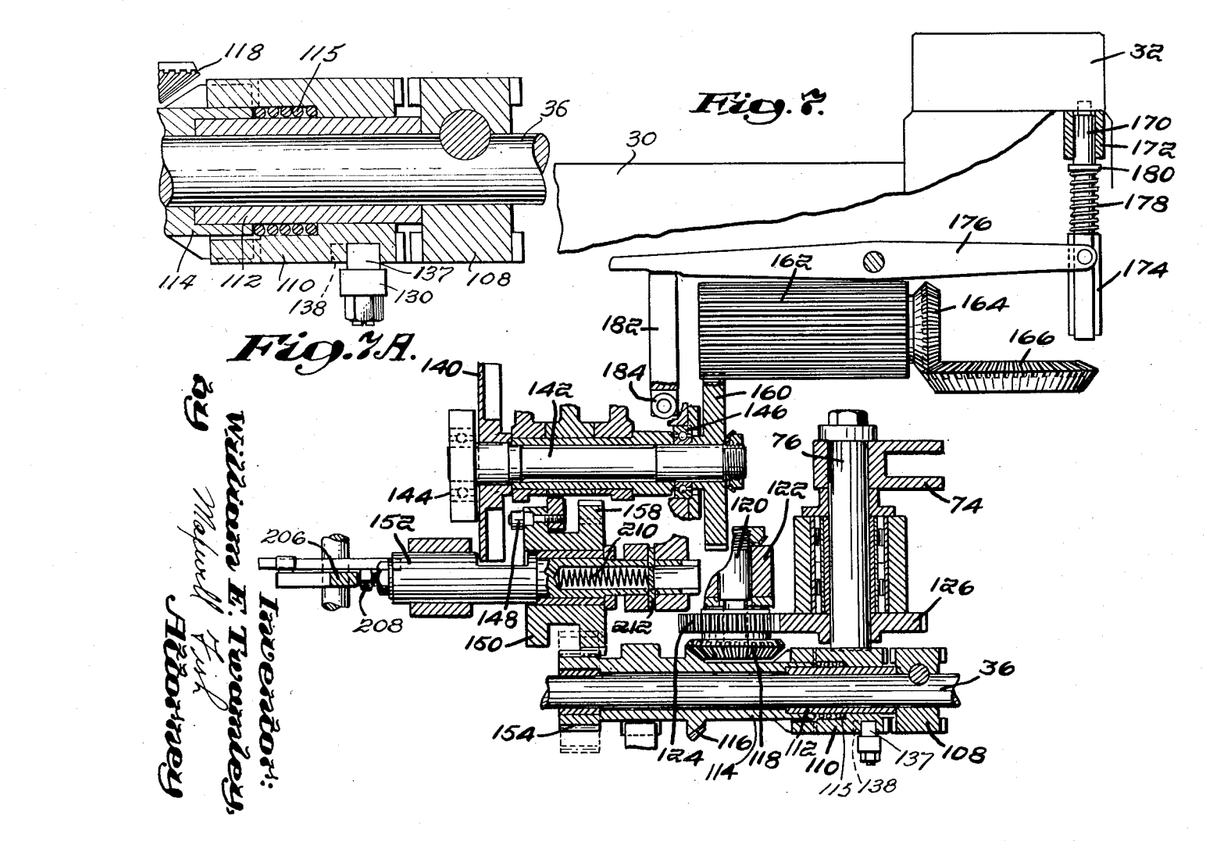
Fig. 7a is an enlarged detail view of the one-revolution clutch mechanism shown on a smaller scale in Fig. 7.
Figure 9:
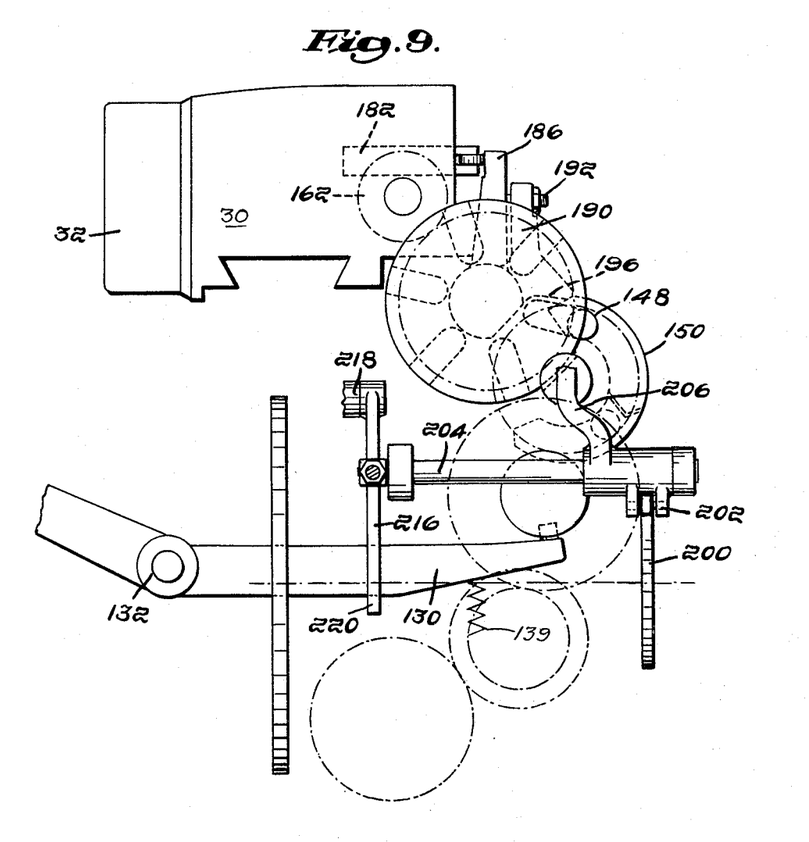
Fig. 9 is a somewhat diagrammatic view looking from the right-hand end of the machine illustrating particularly the Geneva mechanism, the skip cam, and latching devices associated therewith.
Figure 10:
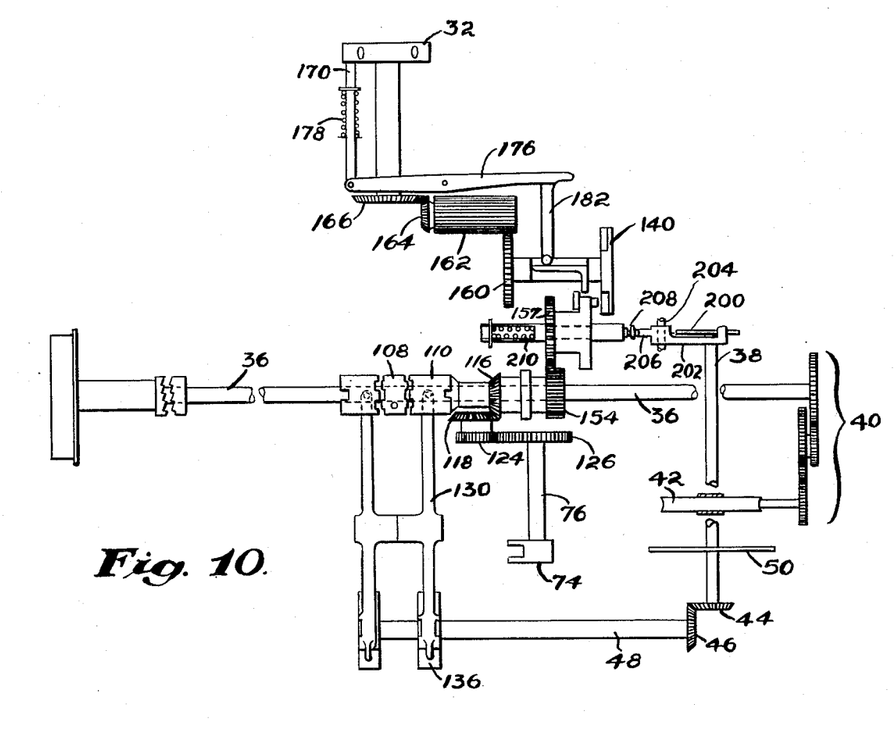
Fig. 10 is a diagrammatic view of the composite gear train for advancing and for indexing the tool supporting thread of the illustrated machine.

The pull-out cam shaft 76 and the double pull-out cam 74 mounted thereon are rotated to impart the required retracting and return movements to the turret slide through connections driven by a one revolution clutch carried on the main drive shaft 36. The one revolution clutch referred to operates also as hereinafter more fully set forth to actuate the Geneva motion mechanism for indexing the tool turret 32. Referring particularly to Figs. 6 and 7 the single revolution clutch comprises a driving clutch member 108 keyed to the drive shaft 36, and a driven clutch member 110 slidably and rotatably supported on a bushing 112, and having a toothed clutch face for engagement with a correspondingly toothed clutch face of the driving clutch member 108. The driven clutch member 110 is also at its other end sleeved on and keyed to turn with a driven sleeve 114 carried on the drive shaft 36. A coiled spring 115 mounted within a recess within the movable clutch member 110 between a shouldered portion thereof and an adjacent end of the sleeve 114 tends to shift the clutch member 110 from the normally inoperative position shown in Figs. 7 and 7a into its engaging position. A bevel gear 116, on the sleeve 114, meshes with a bevel gear 118 on a stub shaft 120 supported in a fixed bearing 122 in parallel relation to the pull-out cam shaft 76. A gear 124 on stub shaft 120 meshes with gear 126 on the pull-out cam shaft 76. The one revolution clutch including the sleeve driving clutch member 108 and the driven clutch member 110 is controlled in a normal manner by means of a clutch lever 130, see Fig. 6, supported intermediate its length on a pivot shaft 132 and provided at its forward end with a follower element 134 for engagement with a clutch control cam 136 on the cam shaft 48. At its rear end the clutch lever 130 is provided with an actuating pin 137 which is arranged for engagement with a peripheral slot 138 in the periphery of the movable clutch member 110 and acts to maintain the clutch normally in a disengaged stop position against the pressure of spring 115. A spring 139 acting against the clutch lever 130 as indicated in Fig. 9 tends to move the lever in a clockwise direction upwardly. Each time that the one-revolution clutch 110 is to be rendered operative during the automatic cycle of the machine the clutch lever 130 is momentarily rocked by engagement with an abutment on the clutch control cam 136 so that the control pin 137 is withdrawn from its slot 138 permitting the clutch 110 to be engaged. Released from the action of this abutment, the clutch lever is biased in the return direction by its spring 139. The control pin 137 again engages in its slot 138, the clutch lever 130 rocks upwardly to the position shown in Fig. 9, and the clutch is automatically disengaged and stopped as the control pin 137 reaches the end of the slot. The arrangement is such that the driven clutch member 110, when shifted into operative position by the operation of the clutch lever 130 is held in operation for one complete revolution and is then automatically shifted to its disengaged position. The one-revolution clutch above described may be referred to in more general terms as a part-revolution clutch inasmuch as the angle through which the driven clutch member rotates may vary in accordance with the requirements of the particular machine.

Figure 8:
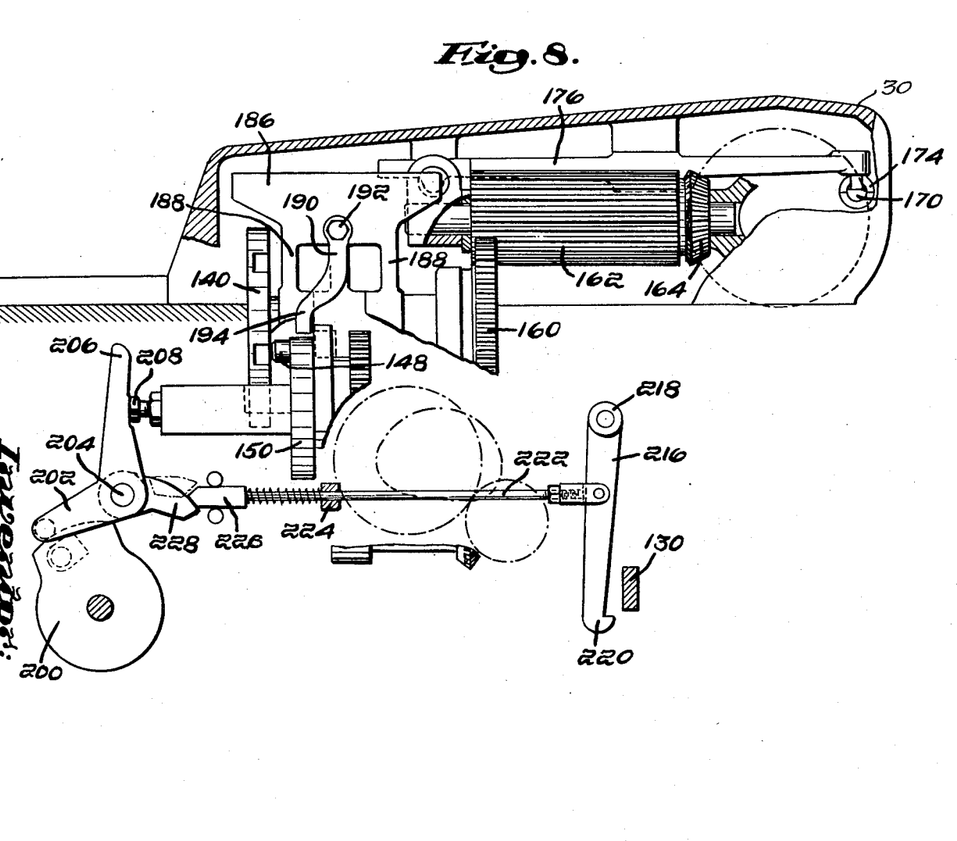
Fig. 8 is a somewhat sketchy view looking from the rear of the mechanism for retracting the Geneva star wheel pin to prevent indexing of the turret, and the mechanism for withdrawing the locking pin from the star wheel prior to indexing.

The mechanism provided in accordance with the invention for indexing the turret comprises a Geneva motion wheel 140 (see Figs. 7, 8 and 9) which is mounted on a shaft 142, carried in suitable bearings 144, 146 on a fixed portion of the machine with its axis parallel to the direction of movement of the turrret slide. Rotational movements are imparted to the Geneva motion wheel 140 and to its supporting shaft 142 by means of a Geneva motion driving pin 148 carried on a disk 150 sleeved to turn on a non-rotatable but axially shiftable pivot shaft 152. The disk 150 and drive pin 148 of the Geneva motion mechanism are driven through successive increments of one revolution each by means of the one revolution clutch 110 through connections which include a gear 154 splined to the sleeve 114, and a gear 158 which is formed integrally with the driving pin disk 150. Motion is transmitted from the Geneva motion wheel 140 and shaft 142 through a gear 160 secured to the shaft 142 to an elongated pinion 162 rotatably mounted on the turret slide 30 with its axis parallel to the shaft 142. A bevel gear 164 formed at the right hand end of the pinion 162 meshes with a bevel gear 166 carried on the supporting shaft 34 of the turret. A locking plunger 170 mounted for reciprocatory movement in a sleeve bearing 172 on the turret slide is arranged to be moved into locking engagement with a recess formed in the turret for each successive indexed position thereof. The plunger 170 at its outer end is supported within a sleeve member 174 which is pivotally connected to a control lever 176. A compression spring 178, interposed between the sleeve member 174 and a collar 180 on the plunger, serves normally to maintain the plunger in its fully extended position. The control lever 176 is rocked to disengage the plunger 170 from the turret 32 for each successive indexing movement by means of a plunger 182 which is supported at one end against a free end of the control lever 176 and at its other end is provided with a roller 184 which engages against an elongated bearing surface 186 of a locking pin release lever 188. As best shown in Figs. 8 and 9 the lever 188 is pivotally supported on the Geneva motion drive shaft 142. The lever 188 and with its surface 186 is moved positively in a direction to rock control lever 176 and thereby to withdraw the locking pin 170 by means of a support lever 190 (see Figs. 8 and 9) pivotally supported intermediate its length on the driving shaft 142 and provided at its upper end with an adjustable stop screw 192 for engagement with the upper portion of the locking pin control lever 188 and at its lower end having an offset follower portion 194 for engagement with a cam abutment 196 on the pin supporting plate 150. With this construction and arrangement of the Geneva motion mechanism and locking pin release mechanism it will be appreciated that each successive movement of the driving pin 148 to index the turret will simultaneously cause the locking pin release lever 188 to be rocked and thereby to release the locking pin 170. The actuating mechanism including the locking pin release lever 188 and the control lever 176 are then permitted to return to their initial inoperative positions. The locking pin is automatically re-engaged in the next succeeding recess by compression spring 178.

In accordance with the present invention there is provided on the lead cam shaft 38 in addition to the lead cam 60 a skip cam 200 which is adapted to move the Geneva motion driving pin 148 out of operative position and thereby to prevent the indexing of the turret when the one revolution clutch is rendered operative to impart a retracting and return movement to the turret slide and turret mounted thereon. As best shown in Figs. 6, 7 and 8 the skip cam 200 is engaged by a follower lever 202 which is mounted to turn on a stationary pivot 204 and is provided with an upwardly extending arm 206 arranged to act against a stop screw 208 on the rear end of the pivot shaft 152. Engagement of the follower lever 202 with a rise portion of skip cam 200 causes the arm 206 to rock in a clockwise direction as shown in Fig. 8, and thereby to move the pivot shaft 152 to the right to the position shown in Fig. 7 in which the Geneva motion drive roller 148 is moved out of alignment with the Geneva motion wheel 140. As the cam lever 202 rides onto a lower portion of its cam a compression spring 210 seated in a recess formed in the rear end of the pivot shaft 152 and engaged by a cross pin 212 causes the pivot shaft 152 and driving roll 148 to return to normal operating position.

The skip cam thus operates to maintain the same operating tool in operating position for two or more successive feeding steps imparted to the turret slide and turret depending upon the contour of cam 200, these steps being separated only by the retracting and return movement of the tool. This arrangement has been found to be of advantage, for example in connection with deep drilling and similar operations which must be effected by several passes of the tool. It has been found for example that the tool should not be advanced to a depth more than three times the diameter on the first pass. During subsequent passes the allowable depth of a milling cut between work withdrawals is further curtailed. The interruption of the milling operation and withdrawal of the tool at intervals in making deep cuts is necessary to clear the hole and to allow oil to enter to cool the drill.

Further in accordance with the invention a locking device is provided which may be rendered operative to prevent the one revolution clutch actuating lever 130 from being tripped into operation while the skip cam follower lever 202 is being moved to shift the Geneva motion drive roller 148 into and out of alignment with the Geneva motion wheel 140. The locking device referred to is constructed and arranged to safeguard against indexing of the turret when the Geneva motion driving pin 148 is only partially engaged with the Geneva motion wheel 140. The locking device referred to has the specific advantage that it allows the operator, when manually setting up the machine, to determine the proper location of the trip dogs on the drum 136.

The mechanism referred to comprises a downwardly extending latch lever 216 which is supported on a stationary pivot 218 and is provided at its lower end with an offset hook portion 220 for engagement beneath one arm of the revolution clutch member 130. The latch lever 216 is connected to one end of a link 222 which is guided through a support 224 and at its free end carries a spring pressed plunger 226 arranged for engagement with the cammed end of a lever arm 228 supported to turn with the skip cam lever 202. Rocking movement of the skip cam lever to the position shown in Fig. 8 in which the Geneva motion driving roller 148 is withdrawn from its operative position causes the cam surface 228 thereof to engage the correspondingly cammed tip of link 222 so that the offset lower end 220 of the latch lever 216 is moved into latching position beneath the single revolution clutch lever 216.

The invention having been described, what is claimed is:

1. Actuating mechanism for a screw machine tool assembly having a rotatable indexing tool supporting turret, and a turret slide on which the turret is mounted which comprises a device for indexing the turret, a lead cam on the machine, a follower lever engaging said cam, a rack supported to move with the turret support, a rocker arm having a toothed engagement with said rack, a movable pivotal support for said rocker arm, a linkage connection between the follower and rocker arm, and means timed with the indexing movement of the turret for moving said pivotal support to effect said reciprocating movements of the turret slide.

2. Actuating mechanism for a screw machine tool assembly having a rotatable indexing tool supporting turret, and a turret slide on which the turret is mounted which comprises a device for indexing the turret, a lead cam supported on the machine, a cam follower pivotally supported on the machine, a rocker arm, a rack movable with the turret slide having a toothed engagement with the rocker, a movable pivotal support on which the rocker is mounted intermediate its length comprising a horizontally disposed slot formed on the machine, and a member providing a pivotal support for the rocker engaging in said slot, a cam engaging said rocker pivot, spring means acting to move the turret slide in a direction to engage the rocker pin with its cam, and means timed with the said indexing means for rotating said cam.

3. Actuating mechanism for a screw machine tool assembly having a rotatable indexing tool supporting turret, and a turret slide on which the turret is mounted which comprises a device for indexing the turret, a lead cam supported on the machine, a cam follower, and a toothed rocker arm, each pivoted on the machine and each having a downwardly extending arm, a linkage connection between said arms, a rack on the turrent slide having a toothed engagement with the rocker arm, a pivotal support for the arm movable on the machine, a cam element movably supported on the machine and arranged to act on said movable pivot to move said linkage connections in the same direction as said lead cam, and spring means biasing said turret slide in a direction to engage said linkage connections with the respective cams.

4. Actuating mechanism for a screw machine tool assembly having a rotatable indexing tool supporting turret, and a turret slide on which the turret is mounted which comprises a device for indexing the turret, a toothed rocker arm on the machine and a rack engaging therewith on the turret slide for imparting retracting and return and feeding movements to the turret slide, a lead cam and a follower having a pivotal connection with the rocker arm for actuating said rocker arm to feed the turret slide and turret mounted thereon, an eccentric on the support arranged to move the rocker arm about its pivotal connection with the lead cam for imparting retracting and return movements to the turret slide, and spring means biasing said turret slide in the direction of said retracting movement.

5. Actuating mechanism for a screw machine tool assembly having a rotatable work indexing tool turret, and a turret slide on which the turret is mounted which comprises a turret indexing device including a Geneva motion star wheel and an actuating pin, a part-revolution clutch connected to actuate the Geneva motion pin including a clutch lever shiftable from a normally clutch disengaged position to engage the clutch, a Geneva motion skip cam on the machine, connections therefrom to relatively shift the Geneva star wheel and pin into and out of operative relation, and an interlocking device including a latch actuated by the shifting of said connections for latching said clutch lever in said clutch disengaged position during shifting movement.

6. Actuating mechanism for a screw machine tool assembly having a rotatable indexing tool supporting turret, and a turret slide on which the turret is mounted which comprises a lead cam on the machine and connections between the lead cam and turret slide for imparting feeding movements to the turret, a turret indexing device including a Geneva motion star wheel and an actuating pin, means for imparting retracting and return movements to the turret slide, a part revolution clutch connected to actuate the Geneva motion pin and said means for imparting retracting and return movements to the turret slide, a skip cam on the machine and connections therefrom to relatively shift the Geneva motion star wheel and pin out of operative relation to one another, and an interlocking device actuated by shifting movement of the Geneva mechanism star wheel and actuating pin into and out of operative relation to prevent operation of said part revolution clutch during such shifting movement.

7. Actuating mechanism for a screw machine tool assembly having a rotatable indexing tool supporting turret, and a turret slide on which the turret is mounted which comprises a lead cam shaft having its axis transverse to the direction of movement of the turrent slide, a lead cam on said shaft and linkage connections between the lead cam and turret slide for imparting feeding movements to the turret, a turret indexing device including a Geneva motion star wheel and an actuating pin, a skip cam on the lead cam shaft and connections therefrom acting when rendered operative to relatively shift the Geneva motion star wheel and pin out of operative relation to one another, means for imparting retracting and return movements to the turret slide, a part-revolution clutch connected to actuate said Geneva motion mechanism, control means including a clutch lever shiftable from a normally clutch disengaged position to engage said part-revolution clutch, means for driving the clutch, the lead cam shaft and said control means in timed relation, and an interlocking device comprising a latch controlled by said connections from the skip cam to latch siad clutch lever in the clutch disengaged position during each shifting movement of the Geneva motion star wheel and actuating pin into and out of operative relation.

8. Actuating mechanism for a screw machine tool assembly having with a base, an indexing tool turret, and a turret slide supported on the base, the combination of a Geneva mechanism including a Geneva motion wheel and a Geneva motion driving pin rotatably supported on the base, means actuated by said Geneva mechanism for indexing the turret, a lead cam, and linkage connections between the lead cam and turret slide carried on the base including a lead cam follower lever, a lead cam pivoted from the base to move the turret slide, a link connecting said lever, and means operable to change said linkage connections to effect a retracting and return movement of the turret slide, and means for controlling said indexing and retracting and return movements comprising a one revolution clutch, and branch transmissions from said clutch connected to each of said Geneva motion driving pin and said means for changing said linkage connections.

9. Actuating mechanism for a screw machine tool assembly having with a base, an indexing tool turret, and a turret slide supported on the base, the combination of a Geneva mechanism including a Geneva motion wheel, and a Geneva motion driving pin supported from the base to turn on axes parallel to said path, operating connections from said Gevena wheel including a motion transmitting connection from the base onto the turret slide for indexing the turret, a lead cam, and linkage connections between the lead cam and turret slide carried on the base including a lead cam follower lever, a lead lever pivoted on the base and connected to move said slide, a link connecting said levers, means operable to change said linkage connections to effect a retracting and return movement of the turret slide, and a one revolution clutch, means controlled by the machine for actuating said clutch, and branch transmissions from said clutch connected to each of said Geneva motion driving pin and said means operable to change said linkage connections.

10. Actuating mechanism for a screw machine tool assembly having a rotary tool supporting turret, and a turret slide on which the turret is mounted which comprises a lead cam on the machine and linkage connections between the lead cam and the turret slide for imparting feeding movements to the turret, a turret indexing device including a Geneva motion star wheel and an actuating pin, a device acting upon said linkage connections to impart retracting and return movements to the turret slide, a mechanical shock absorber device arranged to engage and check movement of the turret slide at the extreme rear position comprising a stop plunger arranged to be engaged by the slide having tapered surfaces and spring plungers engaging therewith to resist rearward movement of the stop plunger driving connections for the machine including a one revolution clutch, and separate driving connections from the clutch to each of said turret indexing device and said turret slide retracting and return device.

References Cited in the file of this patent
UNITED STATES PATENTS

| | | |
|---|---|---|
| 2,481,712 | Benes | Sept. 3, 1949 |
| 2,657,453 | Brodhun | Nov. 3, 1953 |
| 2,660,895 | Waters | Dec. 1, 1953 |